US011629763B2

(12) United States Patent
Tissot et al.

(10) Patent No.: US 11,629,763 B2
(45) Date of Patent: Apr. 18, 2023

(54) CLUTCH ASSEMBLY FOR A MANUAL TRANSMISSION OF A MOTOR VEHICLE

(71) Applicant: Ford Global Technologies, LLC, Dearborn, MI (US)

(72) Inventors: Andreas Tissot, Remscheid (DE); Carsten Weber, Leverkusen (DE); Frank Kraemer, Neunkirchen-Seelscheid (DE); Bernhard Mueller, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/154,339

(22) Filed: Jan. 21, 2021

(65) Prior Publication Data

US 2021/0222744 A1 Jul. 22, 2021

(30) Foreign Application Priority Data

Jan. 21, 2020 (DE) .......................... 102020101350.7

(51) Int. Cl.
*F16D 13/58* (2006.01)
(52) U.S. Cl.
CPC .......... *F16D 13/58* (2013.01); *F16D 2300/18* (2013.01); *F16D 2500/1082* (2013.01); *F16D 2500/30421* (2013.01)
(58) Field of Classification Search
None
See application file for complete search history.

(56) References Cited

U.S. PATENT DOCUMENTS

| 4,760,745 | A | * | 8/1988 | Garshelis | ................ | G01L 3/102 |
| | | | | | | 73/862.333 |
| 4,887,461 | A | * | 12/1989 | Sugimoto | ............... | G01L 3/102 |
| | | | | | | 73/115.02 |
| 4,993,529 | A | * | 2/1991 | Leigh-Monstevens | ..................... |
| | | | | | | F16D 25/087 |
| | | | | | | 192/85.54 |

(Continued)

FOREIGN PATENT DOCUMENTS

DE 102008052254 4/2010
DE 102014211679 12/2015
(Continued)

OTHER PUBLICATIONS

WO 2017008799 translation (Year: 2017).*
(Continued)

*Primary Examiner* — Timothy Hannon
(74) *Attorney, Agent, or Firm* — Burris Law, PLLC

(57) ABSTRACT

The disclosure relates to a clutch assembly for a manual transmission of a motor vehicle, having an axially running transmission input shaft which, by way of a clutch having a central release mechanism disposed on the transmission input shaft, is able to be coupled to a motor output shaft. The transmission input shaft has at least one ferromagnetic measuring portion. The magnetization of the ferromagnetic measuring portion is able to be influenced in a magnetoelastic manner by a torsion of the transmission input shaft. Portions of the central release mechanism surround the at least one measuring portion and has a sensor device which is specified for measuring a variable as a function of the magnetization of at least one measuring portion.

20 Claims, 1 Drawing Sheet

(56) References Cited

U.S. PATENT DOCUMENTS

Figure 2:
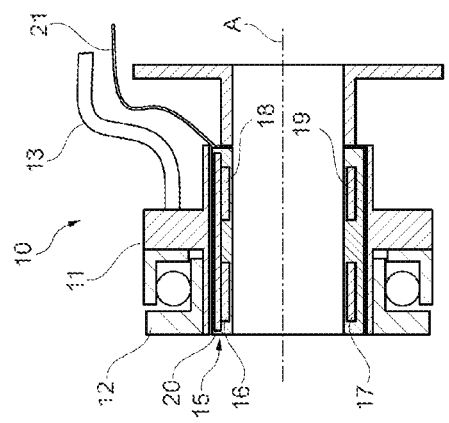

| | | | |
|---|---|---|---|
| 5,585,574 A * | 12/1996 | Sugihara | G01L 3/102 73/862.333 |
| 5,646,356 A * | 7/1997 | Ling | G01L 3/102 73/862.333 |
| 6,289,748 B1 * | 9/2001 | Lin | G01L 3/102 73/862.331 |
| 6,330,833 B1 | 12/2001 | Opie et al. | |
| 6,341,534 B1 * | 1/2002 | Dombrowski | G01D 3/02 324/209 |
| 6,688,445 B2 | 2/2004 | Otto | |
| 6,846,260 B2 * | 1/2005 | Horiuchi | F16H 59/16 475/125 |
| 7,409,878 B2 * | 8/2008 | Von Beck | G01L 3/102 324/207.21 |
| 8,087,304 B2 * | 1/2012 | Lee | G01R 33/07 73/862.333 |
| 9,631,722 B2 | 4/2017 | Pietron et al. | |
| 2004/0112145 A1 * | 6/2004 | May | G01L 3/101 73/862.331 |
| 2014/0050565 A1 * | 2/2014 | Schlosser | F16D 57/04 415/118 |
| 2018/0202540 A1 * | 7/2018 | Prebeck | G01L 3/101 |

FOREIGN PATENT DOCUMENTS

| | | |
|---|---|---|
| DE | 102014217248 | 3/2016 |
| DE | 102015213260 | 1/2017 |
| DE | 102016012863 | 5/2018 |
| DE | 102017202835 | 8/2018 |
| WO | WO-2017008799 A1 * | 1/2017 |

OTHER PUBLICATIONS

Persson et al., Torque Sensor for Automotive Applications—An Investigation of Torque Sensing Techniques for Drivetrain Integration, Master Thesis, Division of Industrial Electrical engineering and Automation (IEA), Lund University, May 2015.

Dollins, What Are Magnetoelastic Sensors for Torque Measurement?, MotionControl Tips information pages, Jan. 31, 2019, pp. 1-9.

* cited by examiner

CLUTCH ASSEMBLY FOR A MANUAL TRANSMISSION OF A MOTOR VEHICLE

CROSS-REFERENCE TO RELATED APPLICATIONS

This application claims priority to and the benefit of German Patent Application Number 102020101350.7 filed on Jan. 21, 2020. The disclosure of the above application is incorporated herein by reference.

FIELD

The present disclosure relates to a clutch assembly for a manual transmission of a motor vehicle.

BACKGROUND

The statements in this section merely provide background information related to the present disclosure and may not constitute prior art.

The measurement of a drive torque in a motor vehicle remains an issue that is gaining relevance in view of new drive systems in which a plurality of torque sources have to be tuned to one another (for example, hybrid drives in which internal combustion engines are operated in parallel and/or in series with electric motors). If the drive torque of a motor, or the contributions from other sources, is/are not known, this can lead to a jolting start or to undesirable load change responses and judders when changing gears. Moreover, the fuel consumption and thus, $CO_2$ emissions can be optimized when the drive torque is exactly known. In the prior art, this is achieved in that an extensive series of tests are carried out in order to develop control algorithms which are intended to estimate the respective amount of torque in the operation of the motor vehicle. The relevant drive components are equipped with expensive torque sensor and cylinder pressure sensor for these tests. Said sensors have a restricted service life and require significantly more installation space than is available in the mass-produced vehicle. Moreover, this method is cost-intensive and time-consuming since one series of tests has to be carried out for each motor vehicle and each drive system in order for the corresponding control model to be developed. Finally, the accuracy of the estimate of the torque derived therefrom is limited. This is caused by inaccuracies within the underlying control model, on the one hand, and by various interference factors such as temperature, air pressure, air humidity, the state and tolerances of the participating sensors or actuators, etc.

In a manual transmission, very dissimilar rotating speeds or torques, respectively, at the motor, on the one hand, and at the transmission, on the other hand, can be present when shifting gear, in particular when the driver per se determines the point in time of a gear shift. Said rotating speeds or torques may be coupled to one another in a controlled manner by way of a manual clutch, which may also simultaneously functions as a starting clutch. However, an ideally exact knowledge of the drive torque (thus of the motor output torque or of the transmission input torque, respectively) is used for corresponding controlling, as has already been discussed above, where the determination of the drive torque in manual clutches currently used is based on a model-based estimate which is inevitably inexact.

German Patent Application No. DE 10 2008 052 254 A1 discloses a hybrid module of a hybrid drive of a motor vehicle, having an electric motor and a separating clutch, wherein the hybrid module is disposed between a motor vehicle transmission and an internal combustion engine. At least one operating parameter assigned to the separating clutch, in particular a displacement path of a displaceable piston of the separating clutch and/or the torque transmitted by the separating clutch, can be determined. A sensor is disposed and designed in such a way that the at least one operating parameter can be directly measured is provided.

A method for attaching a magnetoelastic transducer to a component having a longitudinal axis in order to generate a magnetic field, which is contained in the interior of the component and is distorted when the component is torsioned such that said magnetic field deviates from the orientation in the circumferential direction is known from U.S. Pat. No. 6,330,833. The method includes a covering which is composed substantially of a magnetostrictive material and extends in the circumferential direction and has a temperature that exceeds the Curie temperature of said material being applied to a surface region of the component which surrounds the axis. The covering thereafter cools to a temperature that is lower than said Curie temperature, and a magnetic field is applied to the covering at least as long as the temperature of the covering is lower than said Curie temperature so as to magnetically polarize said covering in a predefined circumferential direction about the axis.

U.S. Pat. No. 9,631,722 discloses an automatic transmission having a shaft which has mutually adjacent first, second, and third magnetized strips, which are polarized in an alternating manner. A first torque sensor is disposed so as to be adjacent to the first strip and the second strip and has first and second fluxgates so as to detect a magnetic flux which extends from the first strip and the second strip. A second torque sensor is disposed so as to be adjacent to the second strip and the third strip and has third and fourth fluxgates so as to detect a magnetic flux, which exits from the second strip and the third strip.

U.S. Pat. No. 6,688,445 discloses a clutch system having a clutch assembly as well as an activation installation for activating the clutch assembly, said activation installation for carrying out activation procedures being actuated by an actuator device. A path sensor is provided for detecting a first variable that correlates with the movement of a component which is repositioned when the activation procedure is carried out. A torque sensor assembly is provided for detecting a second variable that correlates with a clutch torque that is transmitted by way of the clutch assembly, where the actuation device, at least temporarily as a function of the second variable, actuates the activation device for carrying out activation procedures.

A motor vehicle having a manual transmission which has an automated clutch which is activatable by way of an electric clutch release installation is known from German Patent Publication No. DE 10 2014 211 679 A1, wherein the clutch release installation for releasing the clutch is able to be activated by a driver of the motor vehicle by way of a first electric clutch activation installation which does not include any clutch pedal. The motor vehicle has a second electric clutch activation installation which is operatively connected to a clutch pedal such that the clutch release installation is able to be activated by the clutch pedal as well as by means of the first clutch activation installation. The clutch activation installation can in particular be a torque sensor which detects a torque acting on a gear shift lever.

Various measuring methods by means of which a torque in a rotating shaft can be determined are investigated in the master thesis "Torque Sensor for Automotive Applications—An investigation of torque sensing techniques for drivetrain integration", O. Persson, G. Persson, Lund University, May 2015. A magnetoelastic measuring method is in particular also proposed here.

Accordingly, there is still room for improvement when determining the drive torque on a clutch of a manual transmission. The determination or detection, respectively, herein is to take place using ideally compact systems that are neutral in terms of installation space.

SUMMARY

This section provides a general summary of the disclosure and is not a comprehensive disclosure of its full scope or all of its features.

It is to be pointed out that the features and measures specified individually in the following description may be combined with one another in any technically expedient manner and highlight further configurations of the disclosure. The description additionally characterizes and specifies the disclosure in particular in conjunction with the figures.

A clutch assembly for a manual transmission of a motor vehicle is made available by the disclosure. The motor vehicle can be a vehicle with an internal combustion engine, hybrid vehicle, or a purely electric vehicle. In each case, the corresponding motor vehicle has a manual transmission, that is to say that, as opposed to an automatic transmission, the selection of a gear takes place by the driver. This includes the possibility that the clutch procedure is controlled by the driver, in the manner corresponding to a manually activated shift gear (manual transmission; MT), or by an E-clutch, thus an automated clutch. There is likewise the possibility of the clutch procedure in the event of each gear change, as well as when starting, taking place in a manner corresponding to an automated shift gear (automated manual transmission; "AMT"). In the case of an automated shift gear, there is also the possibility that there is a driving mode in which the point in time of the gearshift is automatically determined, likewise the possibility that specific gear changes requested by the driver are checked and rejected by a vehicle control unit (for example, the bypassing of gears when shifting). Under certain circumstances, this can also be a double/dual clutch transmission; "DCT").

In one form, the clutch assembly includes an axially running transmission input shaft which by way of a clutch having a central release mechanism disposed on the transmission input shaft is able to be coupled to a motor output shaft. The transmission input shaft is disposed so as to be within the clutch assembly toward the transmission, or so as to be transmission-proximal. Said transmission input shaft is at least predominantly composed of metal, such as steel. In one form, the cross section of the transmission input shaft may be at least in portions circular, where the diameter is not consistent along the length of the transmission input shaft. In some forms, non-circular cross sections may also be present in portions, for example in such a manner that the transmission input shaft has a toothing. An axial direction, and thus implicitly also a radial and tangential direction, is defined by the direction of the profile of the transmission input shaft.

The transmission input shaft by way of the clutch is able to be coupled to a motor output shaft. The motor output shaft herein is generally a shaft which is coupled directly or indirectly to at least one motor, the latter potentially being an internal combustion engine or an electric motor. That is to say that the motor output shaft is disposed toward the motor or so as to be motor-proximal. In the case of an internal combustion engine, said motor output shaft can be connected in a rotationally-fixed manner to the crankshaft or else form part of the crankshaft. The material and of the geometric design of the motor output shaft may be similar to the transmission input shaft. The clutch herein, in a known manner, is provided to be opened and closed again when shifting gear, said clutch thus functioning as a manual clutch. The latter is moreover may be provided as a starting clutch, that is to say that said coupling is closed when the vehicle is being started. The clutch may establish a force-fit between the transmission input shaft and the motor output shaft by way of a system of disks. For example, a motor flywheel can be connected in a rotationally fixed manner to the motor output shaft, while a clutch disk is connected in a rotationally fixed manner to the transmission input shaft. The clutch disk herein can be disposed between the motor flywheel and a thrust disk or a compression disk, which is axially displaceable so as to selectively press the clutch disk against the motor flywheel and in this way establish the force-fit. The clutch has a central release mechanism on the transmission input shaft. The central release mechanism herein surrounds the transmission input shaft (part of the latter) and is specified for activating the clutch. More specifically, the central release mechanism in the tangential direction extends so as to encircle the transmission input shaft. Said central release mechanism can act on the above-mentioned thrust disk, for example, and thus ensure the axial adjustment of the latter. This takes place, for example, by way of an interposed diaphragm spring which is activated by being axially impinged by the central release mechanism. The central release mechanism may have one part that is fixed axially on the transmission input shaft, as well as one part that (for example, by electrical actuation) is displaceable axially in relation to the transmission input shaft. The functional mode of the central release mechanism is not limited in the context of the disclosure. Besides an electrical activation, a hydraulic or mechanical activation is thus also possible.

According to the disclosure, the transmission input shaft has at least one ferromagnetic measuring portion, the magnetization thereof being able to be influenced in a magnetoelastic manner by a torsion of the transmission input shaft. In one form, the at least one measuring portion is disposed on the transmission input shaft. Said measuring portion is configured so as to be ferromagnetic, that is to say that said measuring portion is composed of a ferromagnetic material. Mechanical stress within a ferromagnetic material influences the magnetization of the latter by virtue of a magnetoelastic effect (also referred to as an inverse magnetostrictive effect or the Villari effect). The corresponding variation of the magnetization can be registered by various measuring methods, on account of which a conclusion in terms of the mechanical stress and thus the underlying mechanical forces is possible. The respective measuring portion is mechanically coupled to the transmission input shaft in such a manner that a torsion of the transmission input shaft causes a deformation of the measuring portion, for example likewise a torsion in the latter. The magnetization of the measuring portion is in turn varied on account thereof. A conclusion in terms of the torsion of the transmission input shaft is thus possible by way of the variation of the magnetization of the measuring portion.

The central release mechanism according to the disclosure at least partially surrounds at least one measuring portion and has a sensor device that is specified for measuring a variable as a function of the magnetization of at least one measuring portion. The central release mechanism at least partially, or in portions, surrounds the measuring portion. More specifically, the central release mechanism in the tangential direction extends so as to encircle the at least one measuring portion (or part of the latter). In terms of the axial extent, the central release mechanism extends either along a sub-portion of the respective measuring portion or along the entire axial extent of the latter.

In one form, the central release mechanism has a sensor device that is specified for measuring a variable as a function of the magnetization of the at least one measuring portion. In one form, the sensor installation is specified for at least indirectly detecting the magnetization of the measuring portion. This includes the possibility that no absolute value of magnetization is detected, but a variation of said magnetization. There exist various measuring methods for determining said variable, which is a function of the magnetization. The disclosure is not limited in terms of the measuring method while some measuring methods will nevertheless be discussed herein. The central release mechanism has the sensor device, this including in particular the possibility that said sensor device can be fixedly connected to the central release mechanism. In one form, the sensor device conjointly with the central release mechanism (or with other parts of the central release mechanism) forms a functional group which as a preassembled entity is installed in the clutch assembly. In one form, the sensor device is integrated in the central release mechanism. The overall dimensions of the central release mechanism do not have to be changed to this end, or do not have to be substantially changed to this end, since a reliably operating sensor device with a small installation space can be implemented. In one form, to the extent that the central release mechanism has an axially movable part and an axially stationary part, the sensor device is connected to the axially stationary part. In this way, the axial position of the sensor device does not vary in relation to the at least one measuring portion, which could impede a reliable measurement of the magnetization.

It is understood that a conclusion in terms of the torsion of the transmission input shaft can be made by way of the measured values determined by the sensor device, and thus an indirect conclusion can be made in terms of the torque which acts on said transmission input shaft. A determination of the torque in the transmission input shaft (it could also be said the output torque) is therefore possible using the clutch assembly according to the disclosure. A direct conclusion in terms of the torque is possible and may avoid the inaccuracies that arise when estimating the torque based on models. The measurements can thus not only be carried out within series of tests in the development of a vehicle, but can also be used in the mass-produced vehicle in order to determine the torque in real time. Furthermore, the measurement of the variable as a function of the magnetization is possible in a contactless manner such that no measurement-related friction or wear arises. As such, a measurement of the drive torque enables improved control of the clutch, on account of which a jolting start, undesirable load change responses, and judders when changing gears or the like can be avoided and the fuel consumption and thus, $CO_2$ emissions can also be reduced.

The used measurement herein can be implemented using a sensor device of a small construction size such that no modifications, or slight modifications of the other components are used in comparison to a conventional clutch assembly without corresponding measuring possibilities. As has already been mentioned, the central release mechanism overall can have external dimensions that are comparable to those of a conventional central release mechanism without a sensor device. It is therefore possible for the central release mechanism with the sensor device used according to the disclosure to be integrated in various conventional clutch assemblies, this even being possible in the context of retrofitting. A replacement of a central release mechanism having a corresponding sensor device is also possible. In one form, the sensor device can be integrated in a plastic housing of the central release mechanism. The clutch assembly can be assembled without complex adjustments of the sensor device, in particular when the sensor device is integrated in the central release mechanism. The measurement based on the magnetoelastic effect moreover enables the torque to be determined in a manner which is insensitive in relation to external interference factors as well as in relation to potential ageing of the sensor device. The robust installation position of the sensor device on or in the central release mechanism protects said sensor device against contamination as well as increased temperatures which could damage said sensor device.

Various measurement arrangements and measuring principles can be used for obtaining conclusions in terms of the magnetization of the measuring portion and thus in terms of the torsion of the transmission input shaft. For example, the sensor device could have a primary coil as well as a secondary coil, where the primary coil is specified for generating a magnetic field which penetrates the at least one measuring portion and by way of which magnetic field a voltage in the secondary coil can be induced. In this case, the magnetization of the measuring portion would thus be actively influenced by the sensor device, so to speak, wherein the measuring portion can also be non-magnetized in the absence of the effect of the sensor device. In this case, the magnetic field generated by the primary coil overall is influenced by the magnetization of the measuring portion and thus by the torsion of the transmission input shaft, on account of which a voltage induced in the secondary coil is in turn influenced. Generally however, a "passive" detection of the torsion is. According to one corresponding design form, the at least one measuring portion is permanently magnetized, and the sensor device is specified for measuring a magnetic field which is at least proportionally generated by the at least one measuring portion. The corresponding magnetic field herein may be present outside the measuring portion such that it can be detected by the sensor device. In some forms, the magnetic field generated by the measuring portion can be overlaid by external magnetic fields which are likewise conjointly detected by the sensor device. However, using suitable methods, it is possible to establish which proportion of the magnetic field emanates from a variable torsion of the measuring portion. The magnetization of the portion can in principle comprise axial, radial and/or tangential components. The magnetization (in the absence of torsion in the transmission input shaft) is at least predominantly, (for example, completely), configured so as to be tangential. In one form, the intensity of the magnetization, at least in the absence of torsion in the transmission input shaft, in the tangential direction is constant in an encircling manner, such that said magnetization is independent of the tangential position. In one form, a magnetization is rotationally symmetrical in terms of the axially running profile axis of the transmission input shaft. This is in contrast to known detection methods, in which a (tangential) coding is introduced on account of the magnetization that is variable in the tangential direction.

According to one form, the transmission input shaft has a plurality of measuring portions which are offset in the axial direction, where two neighboring measuring points are in each case of opposite magnetization. Two measuring portions of opposite magnetization can in particular be provided here, but three or more measuring portions are also conceivable. The magnetization in the case of a plurality of measuring portions can also include dissimilar axial, radial and/or tangential components. In this form, the magnetization of each measuring portion is configured so as to be tangential. That is to say that the magnetization of the mutually neighboring measuring portions runs in opposite directions about the profile axis of the transmission input shaft. In this form, the intensity of the magnetization of each measuring portion, at least in the absence of torsion in the transmission input shaft, in the tangential direction is constant in an encircling manner, that is to say that said legislation is independent of the tangential position. Various advantages can be achieved by combining the magnetization of dissimilar measuring portions. For example, it is thus possible to achieve overlay effects, which enable a more precise determination of the torsion. In particular, however, it is the case that it can be differentiated hereby which axial components of the magnetic field are caused by torsion and which are caused by an external magnetic field that may be present in some forms. In the event of torsion, an axial component which in measuring portions of opposite magnetization is aligned counter thereto, while said axial component in an external (axial) magnetic field has the same alignment in all measuring portions.

As described above, each measuring portion is configured from a ferromagnetic material. According to one form, said measuring portion is made separately from the transmission input shaft and is mechanically connected to the latter in a suitable manner such that a torsion of the transmission input shaft also causes a deformation of the measuring portion. Since the various metals, in particular some types of steel, are distinguished by ferromagnetic properties, but also have such mechanical properties that are used for the functioning of the transmission input shaft, an integral production is also possible. That is to say that, according to one design form, the at least one measuring portion is configured so as to be integral to the transmission input shaft. In one form, the transmission input shaft is made from a magnetizable metal, for example steel, and for the measuring portion to be magnetized in the course of the production or subsequent to the latter. In one form, a plurality of portions of opposite magnetization are generated. A mechanical connection is achieved on account of the at least one measuring portion being configured integrally with the transmission input shaft, where a torsion of the transmission input shaft also means a torsion of the measuring portion. In one form, the production is simplified since it the measuring portion may not be separately produced and to be subsequently connected to the transmission input shaft. A permanent magnetization of the transmission input shaft can also be subsequently generated on or introduced into an already installed transmission.

In one form, the sensor device is disposed so as to be at least predominantly radially inward on the central release mechanism. In this way, said sensor device is disposed so as to directly neighboring the at least one measuring portion and is optionally separated from the latter by an air gap. In one form, a protective layer is provided between the sensor device, or between the components thereof that are relevant in sensory terms, and the measuring portion, said protective layer potentially being composed of plastics material, for example, or of another material which does not have an influence on the magnetic fields present. Moreover, the sensor device, on account of the radially inward disposal, is protected in an optimal manner against contamination or damage (for example, during the assembly).

In one form, when the at least one measuring portion is permanently magnetized, the sensor device preferably has at least one sensor unit which is specified for measuring a magnetic field that is outside the at least one measuring portion and is at least proportionally a function of the magnetization of the at least one measuring portion. The sensor unit, which can simply also be referred to as a sensor, can comprise, for example, a Hall sensor, a magnetoresistive sensor, a magneto-transistor, a magneto-diode, a magnetic field effect transistor (MAGFET), a fluxgate magnetometer, or any other element which is suitable for measuring magnetic fields.

Each measuring portion is assigned at least one sensor unit which along the axial direction is disposed so as to be at least partially level with the measuring portion. In other words, the axial positions of the sensor unit and of the measuring portion, at least partially overlap. In one form, each sensor unit can be assigned to exactly one measuring portion or one sensor unit can simultaneously be assigned to two measuring portions, such that said sensor unit in the axial direction overlaps or coincides with both measuring portions. It should be understood that the magnetic fields that emanate from the magnetization of measuring portion may be registered by the at least one sensor unit that is assigned to this measuring portion. In the case of a plurality of measuring portions, a high level of redundancy in terms of the measurements can be achieved on account of the plurality of sensor units, on account of which the precision can be increased in comparison to a single measuring portion and a single sensor unit, and there is the possibility of guaranteeing the functionality of the sensor device in the event of a defect of a sensor unit.

In one form, at least one measuring portion can be assigned a plurality of sensor units that in tangential terms are disposed so as to be mutually offset with a view to increasing the measuring accuracy as well as redundancy. In one form, corresponding sensor units in the axial direction have an overlap with the measuring portion, and can all be disposed in the same axial position. In one form, said sensor units differ in terms of the tangential position thereof, thus the angular position thereof in relation to the transmission input shaft. For example, two sensor units could be disposed so as to be mutually opposite in relation to the transmission input shaft.

In one form, the sensor device has an output interface and by way of the latter is configured for emitting an output signal as a function of the torsion. The output interface may be a wireless interface or a wire-bound interface. Said output interface can be connected to a connection cable or have a connection cable, which can be configured with multiple cores and provides for the supply of power to the sensor device, for example. To the extent that the central release mechanism has an actuator with an electrical power supply, the latter may be combined with the power supply of the sensor device.

In one form, the sensor device can have a processing unit which is specified for generating the output signal. The processing unit herein typically receives analog measurement signals from the sensor unit or sensor units, and based thereon generates the output signal. This can include a simple conversion to a digital signal, for example, forming a mean value of the individual analog measuring signals, or a more complex mathematical evaluation of said measuring signals from which the output signal is then derived. The processing unit can be disposed on a printed circuit board, for example, on which at least one sensor unit is also disposed. The processing unit may be connected to the output interface.

Further areas of applicability will become apparent from the description provided herein. It should be understood that the description and specific examples are intended for purposes of illustration only and are not intended to limit the scope of the present disclosure.

DRAWINGS

Figure 1:
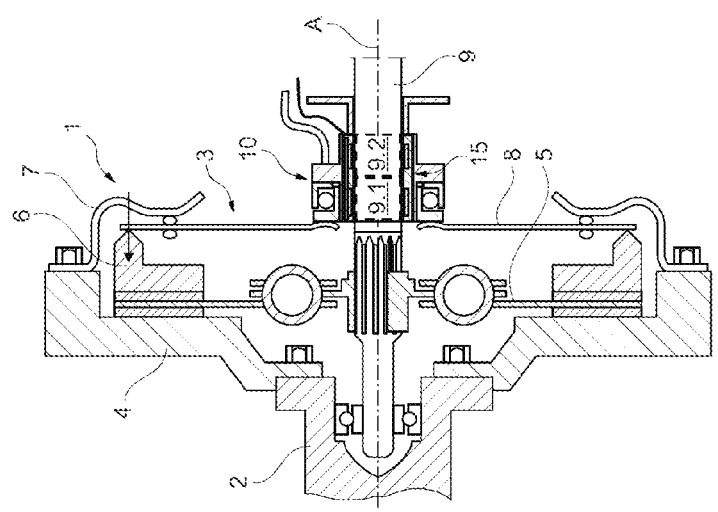

In order that the disclosure may be well understood, there will now be described various forms thereof, given by way of example, reference being made to the accompanying drawings, in which:

FIG. 1 shows a schematic sectional illustration of a clutch assembly according to the present disclosure; and FIG. 2 shows a schematic sectional illustration of a central release mechanism of the clutch assembly of FIG. 1 in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 in a schematic sectional illustration shows a clutch assembly 1 according to the disclosure for a manual transmission of a motor vehicle which can have, for example, an internal combustion engine, an electric motor, or a combination thereof. In one form, a motor output shaft 2 is connected to at least one motor and connected in a rotationally fixed manner to a flywheel 4. In one form, the flywheel 4 forms part of a clutch 3 by way of which the motor output shaft 2 is able to be coupled to a transmission input shaft 9, which in turn is connected to the manual transmission (not shown). In one form, the motor output shaft 2, as well as the transmission input shaft 9, run along an axial central axis (A). In one form, a clutch disk 5 is connected so as to be rotationally fixed yet axially displaceable to the transmission input shaft 9. In one form, a thrust plate, or a compression ring 6 conjointly with a diaphragm spring 8 is connected in a rotationally fixed manner to a clutch cover 7, which in turn is fastened to the flywheel 4. In one form, the clutch disk 5 has friction faces by way of which said clutch disk 5 in the engaged position of the clutch 3 is coupled by way of a force-fit to the compression ring 6 as well as the flywheel 4. In one form, the motor output shaft 2 and the transmission input shaft 9 are thus mutually coupled in a rotationally fixed manner. In one form, the diaphragm spring 8 can be activated by a central release mechanism 10, which in the manner of a ring surrounds a portion of the transmission input shaft 9.

Referring to FIG. 2, in one form, the central release mechanism 10 has a first part 11, which in axial terms remains stationary in relation to the transmission input shaft 9, and the central release mechanism 10 has a second part 12, which in the axial direction is displaceable toward the motor output shaft 2. In one form, in the corresponding displacement, the diaphragm spring 8 is compressed in such a manner that the force-fit between the compression ring 6, the clutch disk 5, and the flywheel 4 is reduced or cancelled.

In one form, the central release mechanism 10 herein is actuated by way of a connection line 13 which, for example, in the case of an electric central release mechanism 10, can be an electrical connection cable, or in the case of a hydraulically operated central release mechanism 10, can be a hydraulic line. In one form, a sensor device 15, which is fixedly connected to the other parts of the central release mechanism 10 and to this extent is integrated in the latter, is configured so as to be radially inward on the central release mechanism 10. In one form, the sensor device 15 can be integrated in a plastics-material housing of the central release mechanism 10. In one form, the sensor device 15 has four sensor units 16, 17, 18, 19, as well as a processing unit 20. In one form, the connection cable 21 serves for supplying the sensor device 15 with power, as well as for outputting an output signal. In one form, the sensor units 16, 17, 18, 19 can be configured as coils or fluxgates, for example, which are connected to the processing unit 20.

Referring back to FIG. 1, in one form, the transmission input shaft 9 has a first measuring portion 9.1 and a second measuring portion 9.2. In one form, the measuring portions 9.1, 9.2 are configured so as to be integral to the remaining transmission input shaft 9 but have a permanent magnetization, which runs in each case tangentially, where the profile direction of the magnetization in the first measuring portion 9.1 is opposite to that in the second measuring portion 9.2. Accordingly, in one form, the first measuring portion 9.1 is opposite to that in the second measuring portion 9.2 may be referred to as ferromagnetic measuring portion(s). In one form, the intensity of the magnetization, at least in the absence of torsion in the transmission input shaft 9, in the tangential direction is constant in an encircling manner. That is to say that said intensity is independent of the tangential position. In one form, first and second sensor units 16, 17 are assigned to the first measuring portion 9.1 and disposed in an axial position, which at least partially corresponds to that of the first measuring portion 9.1. In one form, the first sensor unit 16 is tangentially offset in relation to the second sensor unit 17; more specifically, said first sensor unit 16 in relation to the transmission input shaft is disposed so as to be opposite the sensor unit 17. In one form, third and fourth sensor units 18, 19 are assigned to the second measuring portion 9.2 and disposed in an axial position, which at least partially corresponds to that of the second measuring portion 9.2. In one form, the third sensor unit 18 in relation to the transmission input shaft is disposed so as to be opposite the fourth sensor unit 19.

In one form, each of the measuring portions 9.1, 9.2 has a magnetization, which in turn leads to a magnetic field (and a magnetic flux) which can be detected by the sensor units 16, 17, 18, 19. In one form, the sensor units 16, 17, 18, 19 are in particular specified for detecting an axial component of the magnetic field. In one form, the corresponding component in a tangential magnetization of the two measuring portions 9.1, 9.2 is zero, provided that no external magnetic fields act thereon and that no torque is exerted on the transmission input shaft 9. In one form, a torque that acts on the transmission input shaft 9 leads to the latter being torsioned, on account of which the magnetization of the two measuring portions 9.1, 9.2 is in turn varied. In one form, an (additional) axial component is formed in the first measuring portion 9.1, and an (additional) axial component which is counter to that of the first measuring portion 9.1 is formed in the second measuring portion 9.2. In one form, this can be differentiated from an axial component of an external magnetic field which would be identically aligned in the region of both measuring portions 9.1, 9.2. In one form, the presence or the variation of the axial components is detected by the sensor units 16, 17, 18, 19 and evaluated by the processing unit 20. The latter can generate a digital or optionally analogue output signal that represents the torsion and/or the torque acting on the transmission input shaft 9. The output signal can be emitted by way of the connection cable 21.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A clutch assembly for a manual transmission of a motor vehicle, the clutch assembly comprising:
   an axially running transmission input shaft configured to be coupled to a motor output shaft by way of a clutch having a central release mechanism disposed on the axially running transmission input shaft,
   wherein the axially running transmission input shaft includes at least one ferromagnetic measuring portion,
   wherein a magnetization of the at least one ferromagnetic measuring portion is configured to be influenced in a magnetoelastic manner by a torsion of the axially running transmission input shaft,
   wherein at least a portion of the central release mechanism surrounds the at least one ferromagnetic measuring portion,
   wherein the central release mechanism is interchangeable and includes a sensor device configured to measure a variable as a function of the magnetization of the at least one ferromagnetic measuring portion, and
   wherein the central release mechanism includes a first part and a second part, the first part surrounding the axially running transmission input shaft and fixed relative to the axially running transmission input shaft, the second part surrounding the axially running transmission input shaft and displaceable in an axial direction relative to the first part from a position in which a first axial end of the first part is flush with a second axial end of the second part, the second part also including a portion that is located radially inwardly relative to an outer surface of the first part, the sensor device directly connected with an inner cylindrical surface of the first part.

2. The clutch assembly according to claim 1, wherein the at least one ferromagnetic measuring portion is permanently magnetized, and wherein the variable as the function of the magnetization of the at least one ferromagnetic measuring portion is a magnetic field that is at least proportionally generated by the at least one ferromagnetic measuring portion.

3. The clutch assembly according to claim 1, wherein the at least one ferromagnetic measuring portion of the axially running transmission input shaft includes a plurality of measuring portions that are offset in an axial direction, wherein two neighboring measuring portions among the plurality of measuring portions are in each case of opposite magnetization.

4. The clutch assembly according to claim 1, wherein the at least one ferromagnetic measuring portion is configured to be integral to the axially running transmission input shaft.

5. The clutch assembly according to claim 1, wherein the sensor device is disposed to be at least predominantly radially inward on the central release mechanism.

6. The clutch assembly according to claim 1, wherein the sensor device includes at least one sensor unit configured to measure the variable as the function of the magnetization of the at least one ferromagnetic measuring portion, and wherein the variable as the function of the magnetization of the at least one ferromagnetic measuring portion is a magnetic field that is outside the at least one ferromagnetic measuring portion and is at least proportionally a function of the magnetization of the at least one ferromagnetic measuring portion.

7. The clutch assembly according to claim 6, wherein each of the at least one ferromagnetic measuring portion is assigned at least one of the at least sensor unit that is disposed along an axial direction to be at least partially level with the measuring portion.

8. The clutch assembly according to claim 6, wherein the at least one sensor unit includes a plurality of sensor units, and wherein the at least one ferromagnetic measuring portion is assigned sensors of the plurality of sensor units that are disposed to be mutually offset.

9. The clutch assembly according to claim 1, wherein the sensor device has an output interface that is configured to emit an output signal as a function of the torsion.

10. The clutch assembly according to claim 9, wherein the sensor device includes a processing unit configured to generate the output signal.

11. A clutch assembly comprising:
a transmission input shaft having at least one ferromagnetic measuring portion; and
an interchangeable central release mechanism disposed on the transmission input shaft and including a sensor device, wherein:
a magnetization of the at least one ferromagnetic measuring portion is based on a torsion of the transmission input shaft,
at least a portion of the central release mechanism surrounds the at least one ferromagnetic measuring portion, and
the sensor device is configured to measure a variable as a function of the magnetization,
wherein the central release mechanism includes a first part and a second part, the first part surrounding the axially running transmission input shaft and fixed relative to the axially running transmission input shaft, the second part surrounding the axially running transmission input shaft and displaceable in an axial direction relative to the first part from a position in which a first axial end of the first part is flush with a second axial end of the second part, the second part also including a portion that is located radially inwardly relative to an outer surface of the first part, the sensor device directly connected with an inner cylindrical surface of the first part.

12. The clutch assembly according to claim 11, wherein the at least one ferromagnetic measuring portion is permanently magnetized, and wherein the variable as the function of the magnetization is a magnetic field that is at least proportionally generated by the at least one ferromagnetic measuring portion.

13. The clutch assembly according to claim 11, wherein the at least one ferromagnetic measuring portion of the transmission input shaft includes a plurality of the ferromagnetic measuring portions that are offset in an axial direction, wherein two adjacent ferromagnetic measuring portions among the plurality of the ferromagnetic measuring portions have opposite magnetizations.

14. The clutch assembly according to claim 11, wherein the at least one ferromagnetic measuring portion is integral to the transmission input shaft.

15. The clutch assembly according to claim 11, wherein the sensor device is disposed radially inward on the central release mechanism.

16. The clutch assembly according to claim 11, wherein the sensor device includes at least one sensor unit configured to measure the variable as the function of the magnetization of the at least one ferromagnetic measuring portion, and wherein the variable as the function of the magnetization of the at least one ferromagnetic measuring portion is a magnetic field that is outside the at least one ferromagnetic measuring portion, the magnetic field is at least proportionally a function of the magnetization of the at least one ferromagnetic measuring portion.

17. The clutch assembly according to claim 16, wherein each of the at least one ferromagnetic measuring portion is assigned at least one of the at least one sensor unit that is disposed along an axial direction to be level with the measuring portion.

18. The clutch assembly according to claim 16, wherein the at least one sensor unit includes a plurality of sensor units, and wherein the at least one ferromagnetic measuring portion is assigned sensors of the plurality of sensor units that are disposed to be mutually offset.

19. The clutch assembly according to claim 11, wherein the sensor device has an output interface that is configured to emit an output signal as a function of the torsion.

20. The clutch assembly according to claim 19, wherein the sensor device includes a processing unit configured to generate the output signal.

* * * * *